US012603552B2

(12) United States Patent
Wilson, Jr.

(10) Patent No.: US 12,603,552 B2
(45) Date of Patent: Apr. 14, 2026

(54) ELECTRIC DRIVE UNIT FOR A VEHICLE

(71) Applicant: Schaeffler Technologies AG & Co. KG, Herzogenaurach (DE)

(72) Inventor: Steven Wilson, Jr., Wellington, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 210 days.

(21) Appl. No.: 18/521,542

(22) Filed: Nov. 28, 2023

(65) Prior Publication Data

US 2025/0175061 A1 May 29, 2025

(51) Int. Cl.
| | |
|---|---|
| *H02K 11/40* | (2016.01) |
| *B60K 1/00* | (2006.01) |
| *B60K 17/16* | (2006.01) |

(52) U.S. Cl.
CPC ................ *H02K 11/40* (2016.01); *B60K 1/00* (2013.01); *B60K 17/165* (2013.01)

(58) Field of Classification Search
CPC ......... H02K 11/40; B60K 1/00; B60K 17/165
See application file for complete search history.

(56) References Cited

U.S. PATENT DOCUMENTS

| | | | |
|---|---|---|---|
| 2022/0219520 A1* | 7/2022 | Wehlen | .............. F16H 57/0441 |
| 2024/0120814 A1* | 4/2024 | Ivan | ......................... H02K 1/12 |

* cited by examiner

*Primary Examiner* — Viet P Nguyen
(74) *Attorney, Agent, or Firm* — Price Heneveld LLP

(57) ABSTRACT

A vehicle includes an electric drive unit. The electric drive unit includes a transmission that includes a differential that is operably coupled with half shafts of the vehicle, an electric motor that is configured to drive rotation of a rotor shaft that is operably coupled with the transmission such that rotation of the rotor shaft drives rotation of the half shafts via the transmission, a housing that houses the electric motor, a contact feature coupled to the rotor shaft proximate an axial end of the rotor shaft, and a spring that extends from the housing to abut a portion of the contact feature that is radially aligned with an axis about which the rotor shaft rotates to ground the rotor shaft to the housing.

19 Claims, 3 Drawing Sheets

ELECTRIC DRIVE UNIT FOR A VEHICLE

FIELD OF THE DISCLOSURE

The present disclosure generally relates to an electric drive unit for a vehicle. More specifically, the present disclosure relates to an electric drive unit that includes an electric motor that drives a rotor shaft and a spring that grounds the rotor shaft to a housing of the electric motor.

BACKGROUND OF THE DISCLOSURE

Electric motors for electric drive units often include rings that extend about rotor shafts to ground the rotor shafts to housings of the electric motors. These rings are necessary for grounding of the rotor shafts to the housings to reduce wear, such as pitting, to various components of the electric drive units.

SUMMARY OF THE DISCLOSURE

According to a first aspect of the present disclosure, a vehicle includes an electric drive unit. The electric drive unit includes a transmission that includes a differential that is operably coupled with half shafts of the vehicle, an electric motor that is configured to drive rotation of a rotor shaft that is operably coupled with the transmission such that rotation of the rotor shaft drives rotation of the half shafts via the transmission, a housing that houses the electric motor, a contact feature coupled to the rotor shaft proximate an axial end of the rotor shaft, and a spring that extends from the housing to abut a portion of the contact feature that is radially aligned with an axis about which the rotor shaft rotates to ground the rotor shaft to the housing.

Embodiments of the first aspect of the disclosure can include any one or a combination of the following features:

the contact feature includes a shaft that protrudes into a hollow defined by the rotor shaft and a head coupled to the shaft, wherein the spring abuts the head of the contact feature;

the head is dome-shaped, and the spring abuts a crown of the dome-shaped head;

the rotor shaft is formed of a first material having a first electrical conductivity, and the contact feature is formed of a second material having a second electrical conductivity that is higher than the first electrical conductivity;

the spring is compressed between the housing and the contact feature, such that the spring is configured to maintain abutment with the contact feature via further compression as the rotor shaft shifts axially toward the spring and via decompression as the rotor shaft shifts axially away from the spring;

the contact feature is integrally coupled with the rotor shaft; and the spring is fixedly coupled to the housing.

According to a second aspect of the present disclosure, an electric drive unit for a vehicle includes an electric motor that is configured to drive rotation of a rotor shaft that is operably coupled with a wheel of the vehicle such that rotation of the rotor shaft drives rotation of the wheel, a housing that houses the electric motor, a contact feature coupled to the rotor shaft, and a spring that extends from the housing to abut the contact feature to ground the rotor shaft to the housing.

Embodiments of the second aspect of the disclosure can include any one or a combination of the following features:

a transmission operably coupled with the rotor shaft, such that rotation of the rotor shaft drives rotation of the wheel via the transmission;

the contact feature is coupled to the rotor shaft at an axial end of the rotor shaft; and the spring abuts a portion of the contact feature that is radially aligned with an axis about which the rotor shaft rotates.

According to a third aspect of the present disclosure, an electric drive unit for a vehicle includes an electric motor configured to drive rotation of a rotor shaft, a contact feature coupled to the rotor shaft at an axial end of the rotor shaft and configured to rotate with the rotor shaft, and a spring coupled to a housing that houses the electric motor and extending from the housing to abut the contact feature such that the rotor shaft is grounded to the housing via the contact feature and the spring.

Embodiments of the third aspect of the disclosure can include any one or a combination of the following features:

the contact feature includes a shaft that protrudes into a hollow defined by the rotor shaft and a head coupled to the shaft, wherein the spring abuts the head of the contact feature;

the head is dome-shaped, and the spring abuts a crown of the dome-shaped head;

the spring abuts a portion of the contact feature that is radially aligned with an axis about which the rotor shaft rotates;

the rotor shaft is formed of a first material having a first electrical conductivity, and the contact feature is formed a second material having a second electrical conductivity that is higher than the first electrical conductivity;

the spring is a compression spring;

the spring is compressed between the housing and the contact feature, such that the spring is configured to maintain abutment with the contact feature via further compression as the rotor shaft shifts axially toward the spring and via decompression as the rotor shaft shifts axially away from the spring;

the spring is fixedly coupled to the housing; and the rotor shaft is operably coupled with a differential, such that rotation of the rotor shaft is configured to drive rotation of first and second half shafts operably coupled with the differential.

These and other features, advantages, and objects of the present disclosure will be further understood and appreciated by those skilled in the art by reference to the following specification, claims, and appended drawings.

Figure 1:
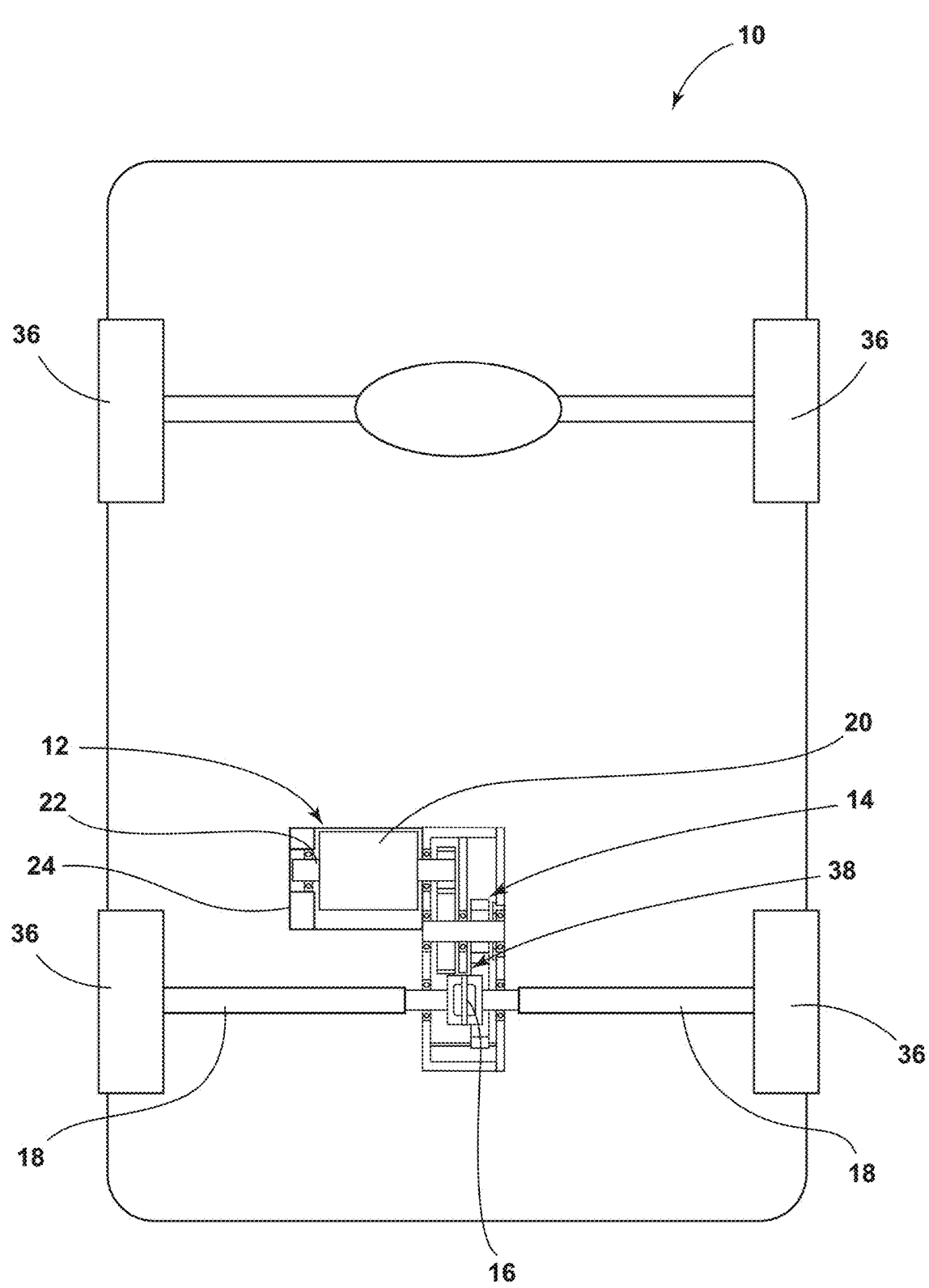
FIG. 1 is a schematic view of a vehicle that includes an electric drive unit that has an electric motor and a transmission, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis.

Figure 2:
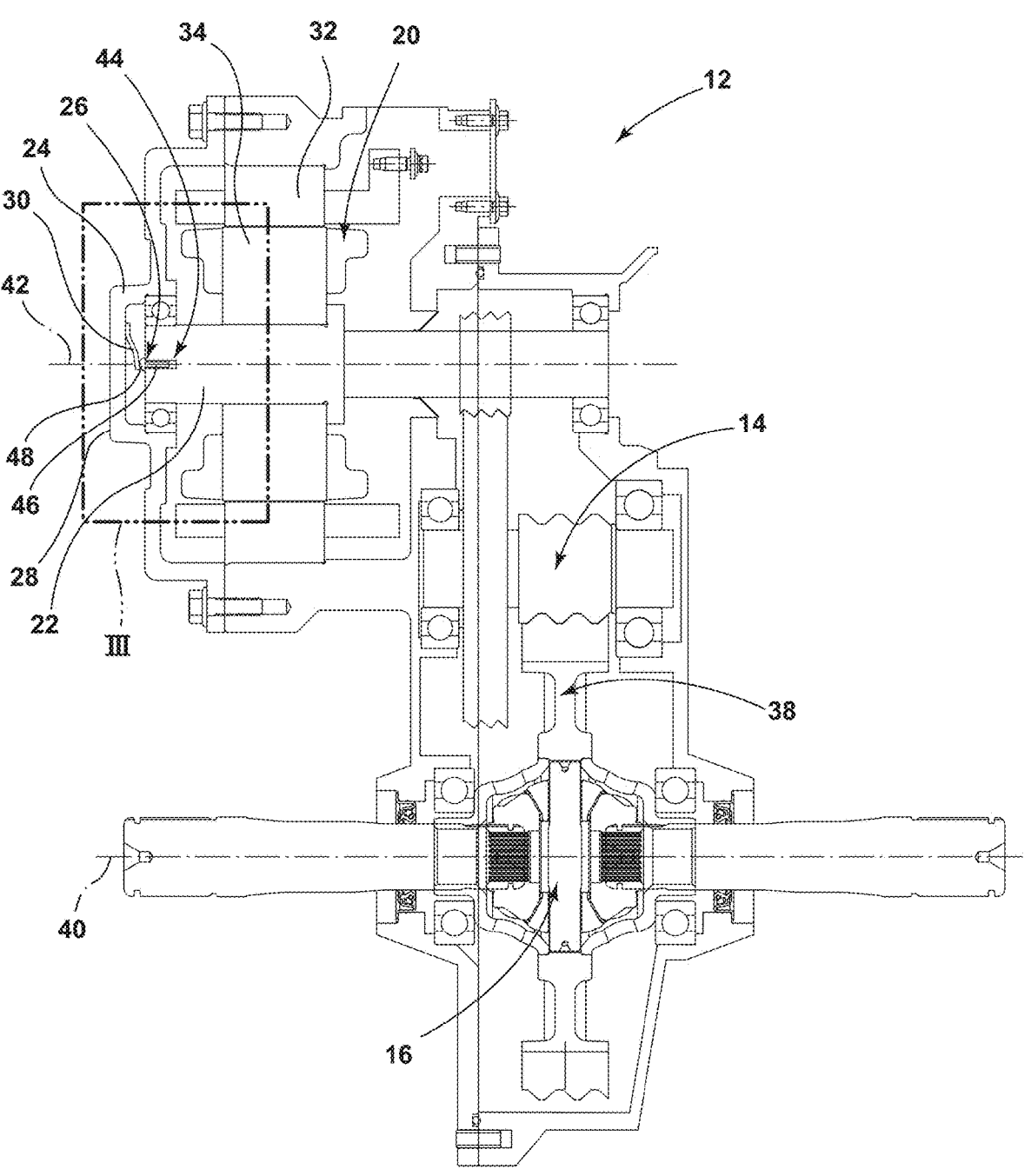
FIG. 2 is a cross-sectional view of an electric drive unit that includes a transmission, a motor disposed within a housing, and a spring that extends between a contact feature that is coupled with a rotor shaft driven by the electric motor and the housing, according to one embodiment.
Figure 3:
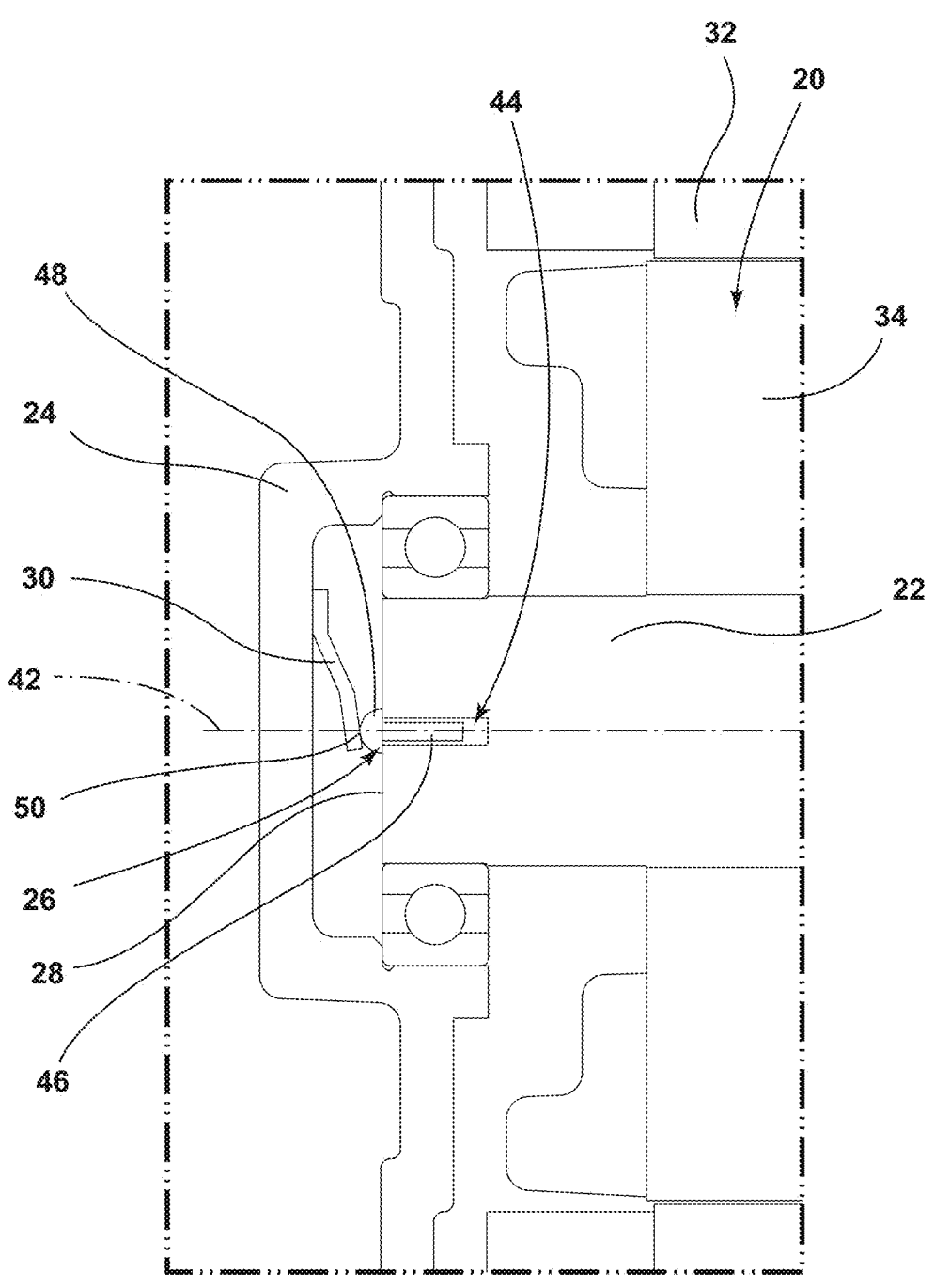
FIG. 3 is an enlarged view of area III of FIG. 2, illustrating the spring extending from the housing and abutting the contact feature, according to one embodiment.

Referring now to FIGS. 1-3, a vehicle 10 includes an electric drive unit 12. The electric drive unit 12 includes a transmission 14. The transmission 14 includes a differential 16 that is operably coupled with half shafts 18 of the vehicle 10. An electric motor 20 is configured to drive rotation of a rotor shaft 22 that is operably coupled with the transmission 14, such that rotation of the rotor shaft 22 drives rotation of the half shafts 18 via the transmission 14. The electric drive unit 12 further includes a housing 24 that houses the electric motor 20. A contact feature 26 is coupled to the rotor shaft 22 proximate an axial end 28 of the rotor shaft 22. A spring 30 extends from the housing 24 to abut a portion of the contact feature 26 that is radially aligned with an axis 42 about which the rotor shaft 22 rotates to ground the rotor shaft 22 to the housing 24.

Referring now to FIG. 1, The vehicle 10 is illustrated. The vehicle 10 may be an electric vehicle and/or a hybrid electric vehicle. In the embodiment illustrated in FIG. 1, the vehicle 10 includes the electric drive unit 12. The electric drive unit 12 includes the electric motor 20. The electric motor 20 can include a stator 32 and a rotor 34 and may be configured to drive rotation of the rotor shaft 22. In various implementations, the rotor shaft 22 is operably coupled with at least one wheel 36 of the vehicle 10, such that rotation of the rotor shaft 22 drives rotation of the at least one wheel 36. In various implementations, the electric drive unit 12 of the vehicle 10 includes the transmission 14. The transmission 14 can include a gearset 38 and/or a differential 16. The gearset 38 is configured to interface with the rotor shaft 22 and the differential 16, and the differential 16 is configured to interface with half shafts 18 that are coupled with wheels 36 of the vehicle 10. As such, rotation of the rotor shaft 22 by the electric motor 20 may drive rotation of the half shafts 18 and the attached wheels 36 of the vehicle 10 via the operable coupling of the half shafts 18 to the rotor shaft 22 by the gearset 38 and the differential 16.

Referring now to FIGS. 2 and 3, the electric drive unit 12 includes the housing 24. The housing 24 houses the electric motor 20, as illustrated in FIG. 2. In some embodiments, the housing 24 can be an assembly of a plurality of components. For example, in the embodiment illustrated in FIG. 2, the housing 24 is a die-cast aluminum housing 24 that is formed of a plurality of components. In the embodiment illustrated in FIG. 2, the housing 24 houses the electric motor 20 and the transmission 14 of the electric drive unit 12. As illustrated, the rotor shaft 22 and portions of two half shafts 18 of the vehicle 10 are disposed within the housing 24. The two half shafts 18 are configured to rotate about an axis 40 that is radially offset from and parallel to the axis 42 about which the rotor shaft 22 is configured to rotate.

Referring still to FIGS. 2 and 3, the electric drive unit 12 includes the contact feature 26. The contact feature 26 is coupled to the rotor shaft 22. In various implementations, the contact feature 26 is coupled to the rotor shaft 22 proximate to the axial end 28 of the rotor shaft 22. For example, as illustrated in FIG. 3, the contact feature 26 is coupled to the rotor shaft 22 at the axial end 28 of the rotor shaft 22. In the embodiment illustrated in FIG. 3, the rotor shaft 22 defines a hollow 44, and the contact feature 26 includes a shaft 46 that protrudes into the hollow 44 defined by the rotor shaft 22. The illustrated contact feature 26 also includes a head 48 that is coupled to the shaft 46. The head 48 may be disposed outside of the hollow 44 at the axial end 28 of the rotor shaft 22. In the embodiment illustrated in FIGS. 2 and 3, the head 48 of the contact feature 26 is dome-shaped and includes a crown 50 that is distal from the rotor shaft 22. In various implementations, the contact feature 26 is radially aligned with the axis 42 about which the rotor shaft 22 rotates. For example, in the embodiment illustrated in FIG. 3, the crown 50 of the dome-shaped head 48 of the contact feature 26 is radially aligned with the axis 42 of the rotor shaft 22. A variety of types of contact features 26 are contemplated.

Referring still to FIGS. 2 and 3, the electric drive unit 12 includes the spring 30. The spring 30 extends from the housing 24 to abut a portion of the contact feature 26. In various implementations, the spring 30 is fixedly coupled to the housing 24 of the electric drive unit 12. For example, the spring 30 may be spot welded to the housing 24 of the electric drive unit 12. The spring 30 may abut a portion of the contact feature 26 that is radially aligned with the axis 42 about which the rotor shaft 22 rotates. For example, in the embodiment illustrated in FIG. 3, the spring 30 abuts the crown 50 of the head 48 of the contact feature 26 that is radially aligned with the axis 42 of the rotor shaft 22.

The spring 30 may be at least one of a variety of types of springs. In various implementations, the spring 30 is a compression spring. In an exemplary embodiment, the spring 30 is a sheet of metal that is configured to resiliently return to an unbiased position when compressive forces on the spring 30 are released. In operation of an embodiment of the electric drive unit 12, the rotor shaft 22 may undergo axial displacement relative to the housing 24 in a first axial direction and a second axial direction opposite the first axial direction. In a home position of the rotor shaft 22, the spring 30 of the electric drive unit 12 may be in a compressed condition, wherein the spring 30 is compressed between the housing 24 and the contact feature 26 coupled to the rotor shaft 22. As such, the spring 30 may be configured to maintain abutment with the contact feature 26 via further compression as the rotor shaft 22 shifts axially toward the spring 30 via axial displacement of the rotor shaft 22 in the first axial direction. Further, the spring 30 may maintain abutment with the contact feature 26 via decompression as the rotor shaft 22 shifts axially away from the spring 30 via axial displacement of the rotor shaft 22 in the second axial direction.

Referring still to FIGS. 2 and 3, the spring 30 that extends from the housing 24 to abut the contact feature 26 coupled to the rotor shaft 22 is configured to ground the rotor shaft 22 to the housing 24 of the electric drive unit 12. In various implementations, the rotor shaft 22, the contact feature 26, the spring 30, and the housing 24 are formed of one or more types of metal. In various embodiments, the rotor shaft 22 is formed of a first material (e.g., steel) having a first electrical conductivity, and the contact feature 26 is formed of a second material (e.g., copper) having a second electrical conductivity that is higher than the first electrical conductivity. The contact feature 26 having a higher electrical conductivity than the rotor shaft 22 allows for efficient grounding of the rotor shaft 22 to the housing 24 via the contact feature 26 and the spring 30. It is contemplated that the spring 30 may likewise be formed of a material with higher conductivity than the material that forms the rotor shaft 22. It is further contemplated that the contact feature 26 may be integrally coupled with the rotor shaft 22, in some implementations.

The electric drive unit 12 of the present disclosure may provide a variety of advantages. First, the contact feature 26 and the spring 30 grounding the rotor shaft 22 to the housing 24 of the electric drive unit 12 may decrease wear to bearings and other components of the electric drive unit 12 that would occur if the rotor shaft 22 were not grounded to the housing 24. Second, the spring 30 abutting a portion of the contact feature 26 that is radially aligned with the axis 42 of the rotor shaft 22 minimizes energy loss due to drag between the spring 30 and the contact feature 26. This energy savings is particularly notable compared to electric drive units that utilize a ring that grounds the rotor shaft to the housing via contact with the circumference of the rotor shaft. Third, the contact feature 26 including a head 48 that is dome-shaped, and the spring 30 contacting the crown 50 of the dome-shaped head 48 further aids in minimizing drag between the contact feature 26 and the spring 30 by reducing the surface area of the contact feature 26 that is in abutment with the spring 30.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 vehicle
12 electric drive unit
14 transmission
16 differential
18 half shafts
20 electric motor
22 rotor shaft
24 housing
26 contact feature
28 axial end
30 spring
32 stator
34 rotor
36 wheel
38 gearset
40 axis of half shafts
42 axis of rotor shaft
44 hollow
46 shaft
48 head
50 crown

What is claimed is:

1. A vehicle, comprising:
an electric drive unit that comprises:
a transmission that includes a differential that is operably coupled with half shafts of the vehicle;
an electric motor that is configured to drive rotation of a rotor shaft that is operably coupled with the transmission, such that rotation of the rotor shaft drives rotation of the half shafts via the transmission;
a housing that houses the electric motor;
a contact feature coupled to the rotor shaft proximate an axial end of the rotor shaft; and
a spring that extends from the housing to abut a portion of the contact feature that is radially aligned with an axis about which the rotor shaft rotates to ground the rotor shaft to the housing, wherein the contact feature includes a shaft that protrudes into a hollow defined by the rotor shaft and a head coupled to the shaft, wherein the spring abuts the head of the contact feature.

2. The vehicle of claim 1, wherein the head is dome-shaped, and the spring abuts a crown of the dome-shaped head.

3. The vehicle of claim 1, wherein the rotor shaft is formed of a first material having a first electrical conductivity, and the contact feature is formed a second material having a second electrical conductivity that is higher than the first electrical conductivity.

4. The vehicle of claim 1, wherein the spring is compressed between the housing and the contact feature, such that the spring is configured to maintain abutment with the contact feature via further compression as the rotor shaft shifts axially toward the spring and via decompression as the rotor shaft shifts axially away from the spring.

5. The vehicle of claim 1, wherein the contact feature is integrally coupled with the rotor shaft.

6. The vehicle of claim 1, wherein the spring is fixedly coupled to the housing.

7. An electric drive unit for a vehicle, comprising:

an electric motor that is configured to drive rotation of a rotor shaft that is operably coupled with a wheel of the vehicle, such that rotation of the rotor shaft drives rotation of the wheel;

a housing that houses the electric motor;

a contact feature coupled to the rotor shaft; and a spring that extends from the housing to abut the contact feature to ground the rotor shaft to the housing, wherein the contact feature includes a shaft that protrudes into a hollow defined by the rotor shaft and a head coupled to the shaft, wherein the spring abuts the head of the contact feature.

8. The electric drive unit of claim 7, further comprising:

a transmission operably coupled with the rotor shaft, such that rotation of the rotor shaft drives rotation of the wheel via the transmission.

9. The electric drive unit of claim 7, wherein the contact feature is coupled to the rotor shaft at an axial end of the rotor shaft.

10. The electric drive unit of claim 9, wherein the spring abuts a portion of the contact feature that is radially aligned with an axis about which the rotor shaft rotates.

11. The electric drive unit for a vehicle of claim 10, wherein the spring extends from the housing to abut the head of the contact feature that is radially aligned with an axis about which the rotor shaft rotates.

12. An electric drive unit for a vehicle, comprising:

an electric motor configured to drive rotation of a rotor shaft;

a contact feature coupled to the rotor shaft at an axial end of the rotor shaft and configured to rotate with the rotor shaft; and a spring coupled to a housing that houses the electric motor and extending from the housing to abut the contact feature, such that the rotor shaft is grounded to the housing via the contact feature and the spring, wherein the contact feature includes a shaft that protrudes into a hollow defined by the rotor shaft and a head coupled to the shaft, wherein the spring abuts the head of the contact feature.

13. The electric drive unit of claim 12, wherein the head is dome-shaped, and the spring abuts a crown of the dome-shaped head.

14. The electric drive unit of claim 12, wherein the spring abuts a portion of the contact feature that is radially aligned with an axis about which the rotor shaft rotates.

15. The electric drive unit of claim 12, wherein the rotor shaft is formed of a first material having a first electrical conductivity, and the contact feature is formed a second material having a second electrical conductivity that is higher than the first electrical conductivity.

16. The electric drive unit of claim 12, wherein the spring is a compression spring.

17. The electric drive unit of claim 16, wherein the spring is compressed between the housing and the contact feature, such that the spring is configured to maintain abutment with the contact feature via further compression as the rotor shaft shifts axially toward the spring and via decompression as the rotor shaft shifts axially away from the spring.

18. The electric drive unit of claim 12, wherein the spring is fixedly coupled to the housing.

19. The electric drive unit of claim 12, wherein the rotor shaft is operably coupled with a differential, such that rotation of the rotor shaft is configured to drive rotation of first and second half shafts operably coupled with the differential.

\* \* \* \* \*